United States Patent
Ochiai (10) Patent No.: US 9,535,478 B2
(45) Date of Patent: Jan. 3, 2017

(54) POWER SUPPLY MANAGEMENT DEVICE, ELECTRONIC APPARATUS, AND POWER SUPPLY MANAGEMENT METHOD

(71) Applicant: FUJITSU LIMITED, Kawasaki-shi, Kanagawa (JP)

(72) Inventor: Michihiro Ochiai, Sendai (JP)

(73) Assignee: FUJITSU LIMITED, Kawasaki (JP)

( * ) Notice: Subject to any disclaimer, the term of this patent is extended or adjusted under 35 U.S.C. 154(b) by 95 days.

(21) Appl. No.: 14/673,386

(22) Filed: Mar. 30, 2015

(65) Prior Publication Data

US 2015/0323978 A1 Nov. 12, 2015

(30) Foreign Application Priority Data

May 7, 2014 (JP) .................................. 2014-096118

(51) Int. Cl.
*G06F 1/26* (2006.01)
*G06F 1/32* (2006.01)

(52) U.S. Cl.
CPC .............. *G06F 1/26* (2013.01); *G06F 1/3287* (2013.01)

(58) Field of Classification Search
CPC .................................. G06F 1/26; G06F 1/3287
USPC .............................. 713/1, 300, 320, 330, 340
See application file for complete search history.

(56) References Cited

U.S. PATENT DOCUMENTS

| 5,637,991 | A | * | 6/1997 | Brown | ...................... | G05F 1/44 |
| | | | | | | 323/269 |
| 6,498,523 | B1 | * | 12/2002 | Gebara | ...................... | G06F 1/26 |
| | | | | | | 327/143 |
| 2009/0106574 | A1 | * | 4/2009 | Xiong | ...................... | G06F 1/26 |
| | | | | | | 713/340 |
| 2010/0223485 | A1 | * | 9/2010 | Zou | ........................... | G06F 1/26 |
| | | | | | | 713/340 |

FOREIGN PATENT DOCUMENTS

| JP | 05-207653 | 8/1993 |
| JP | 2008-117241 | 5/2008 |
| JP | 2010-252444 | 11/2010 |

* cited by examiner

*Primary Examiner* — Mark Connolly
(74) *Attorney, Agent, or Firm* — Arent Fox LLP (57) ABSTRACT

A power supply management device includes: a signal-output-unit for outputting, for each of a plurality of power-supply-lines for which voltage supply is started in a predetermined order, a signal indicating that a voltage of the power-supply-line has reached a given level; and a voltage-shut-off-circuit for short-circuiting one of the power-supply-lines for which voltage supply is started second or later, to a portion at a voltage level lower than a level of a voltage supplied to each of the power-supply-lines, at or before a time point of start of voltage supply to one of the power-supply-lines for which voltage supply is started first, and releasing the one power-supply-line from being short-circuited in accordance with the signal indicating that a voltage of one of the power-supply-lines for which voltage supply is started immediately before voltage supply to the one power-supply-line is started has reached a given level.

19 Claims, 6 Drawing Sheets

POWER SUPPLY MANAGEMENT DEVICE, ELECTRONIC APPARATUS, AND POWER SUPPLY MANAGEMENT METHOD

CROSS-REFERENCE TO RELATED APPLICATION

This application is based upon and claims the benefit of priority of the prior Japanese Patent Application No. 2014-096118, filed on May 7, 2014, the entire contents of which are incorporated herein by reference.

FIELD

The embodiments discussed herein are related to a power supply management device, an electronic apparatus, and a power supply management method.

BACKGROUND

The following are known examples of techniques for managing a plurality of power sources.

A power shut-off device for an analog circuit to which a plurality of power source voltages have to be supplied, for example, has been proposed. The power shut-off device includes current interruption units that are provided so as to correspond to power supply lines, respectively, and that each interrupt the flow of an overcurrent when the overcurrent flows through the line. The power shut-off device also includes current-interruption detection units that are provided so as to correspond to the current interruption units, respectively, and that each detect that a current flow has been interrupted by the current interruption unit. The power shut-off device also includes a logical unit that determines, based on an output signal from each current-interruption detection unit, whether or not to supply a power source voltage to the analog circuit. The power shut-off device also includes a switching unit that turns on or off output of a power source voltage to the analog circuit, based on a determination signal from the logical unit. When any one of the current-interruption detection units of power supply lines detects interruption of a current flow, the power shut-off device turns off output of a power source voltage of any line other than the line concerned.

An information processing device including a master electronic circuit, a slave electronic circuit coupled to the master electronic circuit, a second power source that supplies power to the slave electronic circuit through a system different from that of a first power source that supplies power to the master electronic circuit, and a power control circuit that controls power supply to the slave electronic circuit has also been proposed. In this information processing device, in a power saving mode, supply of power from the second power source to the servant electronic circuit is shut off and output of the second power source stops. In the power saving mode, in the case where an input signal is supplied to the master electronic circuit, a power control circuit supplies power from the second power source to the slave electronic circuit after a predetermined period has elapsed since resumption of output of the second power source.

A power supply management device including a control unit that controls a plurality of power sources has been proposed. The power supply management device includes power supply units that are provided for a plurality of power sources, respectively, and that each start supplying power based on a control signal output from the control unit, and output an OK signal to the control unit when supply of power has been normally started. The power supply management device also includes a shut-off unit that controls the power supply units to shut off all the power sources when a control signal from the control unit is not output in a predetermined period of time.

Examples of the related-art techniques are disclosed in Japanese Laid-open Patent Publication No. 5-207653, Japanese Laid-open Patent Publication No. 2008-117241, and Japanese Laid-open Patent Publication No. 2010-252444.

Recently, multiple-power-source devices, such as a field-programmable gate array (FPGA), to which a plurality of power source voltages are supplied have been used for many electronic apparatuses. An electronic apparatus including such a multiple-power-source device has a configuration in which a plurality of devices including a multiple-power-source device share power sources in order to realize size reduction and increased density. That is, regarding a power supply line for supplying a power source voltage, for example, of 1.5 V to a multiple-power-source device, another 1.5 V powered device may be connected to this line. Regarding another power supply line for supplying a power source voltage, for example, of 2.5 V to a multiple-power-source device, another 2.5 V powered device may be connected to this line.

For a plurality of power sources that supply power source voltages to a multiple-power-source devices, the order in which the plurality of power sources are turned on is determined in advance in some cases. Unintended operations (for example, the occurrences of a latch-up event and an excessive rush current) in a multiple-power-source device are prevented by appropriately setting the order in which the plurality of power sources are turned on.

In a multiple-power-source device, although power supply input terminals connected to power supply lines are isolated from one another, there may be a problem in that a voltage input to one power supply input terminal from a power source turned on first is input to another power supply input terminal. This may be due to, for example, formation of a parasitic element inside a semiconductor constituting a multiple-power-source device. Once such voltage re-direction occurs, a voltage appears in a power supply line connected to the other power supply input terminal at a timing earlier than a timing in accordance with the power supply sequence. Thus, there are some cases in which another device connected to the power supply line concerned is turned on at a timing earlier than the original timing and, as a result, a malfunction of the electronic apparatus occurs.

It is difficult to recognize, during the design phase, whether or not voltage re-direction has occurred in a multiple-power-source device. It is thus difficult to address this issue in advance. For this reason, in existing techniques, it is usual to check whether or not voltage re-direction is present and whether or not voltage re-direction affects another device, and the power supply sequence is then appropriately changed, if desired.

However, it is not easy to change a complex power supply sequence, and there are some cases where the issue is not solved merely by changing a power supply sequence.

SUMMARY

According to an aspect of the invention, a power supply management device includes: a signal-output-unit for outputting, for each of a plurality of power-supply-lines for which voltage supply is started in a predetermined order, a signal indicating that a voltage of the power-supply-line has reached a given level; and a voltage-shut-off-circuit for short-circuiting one of the power-supply-lines for which voltage supply is started second or later, to a portion at a voltage level lower than a level of a voltage supplied to each of the power-supply-lines, at or before a time point of start of voltage supply to one of the power-supply-lines for which voltage supply is started first, and releasing the one power-supply-line from being short-circuited in accordance with the signal indicating that a voltage of one of the power-supply-lines for which voltage supply is started immediately before voltage supply to the one power-supply-line is started has reached a given level.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, an example of embodiments of techniques of this disclosure will be described with reference to the accompanying drawings. It is noted that, in the drawings, the same or the corresponding components are denoted by the same reference characters.

First Embodiment

Figure 1:
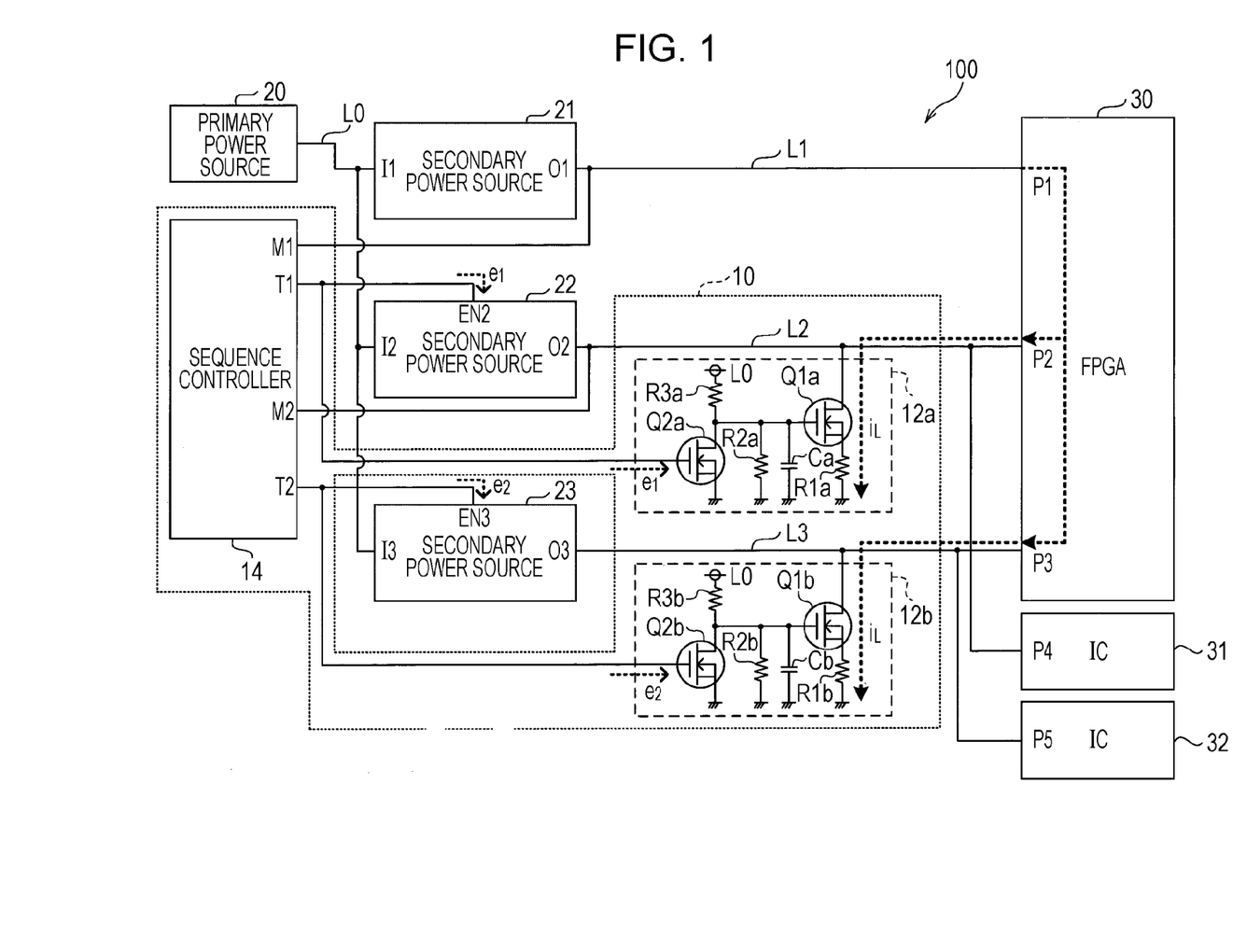
FIG. 1 is a block diagram illustrating a configuration of an electronic apparatus including a power supply management device according to an embodiment of techniques of this disclosure.

FIG. 1 is a block diagram illustrating a configuration of an electronic apparatus 100 including a power supply management device 10 according to a first embodiment of techniques of this disclosure.

The electronic apparatus 100 has a configuration in which, using a distributed power system, a plurality of power source voltages at levels different from one another are generated by a plurality of power sources and are supplied to the load. The distributed power system is a system in which an intermediate bus voltage obtained by conversion using a single isolated converter (intermediate bus converter) is provided, and then the intermediate bus voltage is converted into a desired voltage level using a plurality of non-isolated (point of load: POL) converters arranged very close to the load.

A primary power source 20, being an isolated converter constituting an intermediate bus converter, converts a voltage of, for example, 48 V supplied from a backplane not illustrated into a voltage of 12 V and outputs the 12 V voltage. The voltage from the output terminal of the primary power source 20 is supplied via a power supply line L0 to secondary power sources 21, 22 and 23.

The secondary power source 21 includes an input terminal I1 connected to the power supply line L0 and an output terminal O1 connected to the power supply line L1. The secondary power source 21 converts an output voltage of the primary power source 20 supplied at the input terminal I1 to a voltage of, for example, 1.5 V and outputs the 1.5 V voltage from the output terminal O1.

A secondary power source 22 includes an input terminal I2 connected to the power supply line L0 and an output terminal O2 connected to a power supply line L2. The secondary power source 22 also includes an enable input terminal EN2 connected to a signal output terminal T1 of a sequence controller 14. The secondary power source 22 is turned on, in accordance with a status signal $e_1$ output from the signal output terminal T1 of the sequence controller 14 and input to the enable input terminal EN2, and converts an output voltage of the primary power source 20 supplied at the input terminal I2 to a voltage of, for example, 2.5 V and outputs the 2.5 V voltage from the output terminal O2.

The secondary power source 23 includes an input terminal I3 connected to the power supply line L0 and an output terminal O3 connected to a power supply line L3. The secondary power source 23 also includes an enable input terminal EN3 connected to a signal output terminal T2 of the sequence controller 14. The secondary power source 23 is turned on, in accordance with a status signal $e_2$ output from the signal output terminal T2 of the sequence controller 14 and supplied to the enable input terminal EN3, and converts an output voltage of the primary power source 20 supplied at the input terminal I3 to a voltage of, for example, 3.3 V and outputs the 3.3 V voltage from the output terminal O3.

The power supply line L1 to which power is supplied from the secondary power source 21 is connected to a power supply input terminal P1 of an FPGA 30, which is a multiple-power-source device. A voltage input through the power supply line L1 to the power supply input terminal P1 is used, for example, as a power source for cores in the FPGA 30. The FPGA 30 has, for example, a form in which a semiconductor chip is contained in a package.

The power supply line L2 to which power is supplied from the secondary power source 22 is connected to the power supply input terminal P2 of the FPGA 30. A voltage input through the power supply line L2 to the power supply input terminal P2 is used, for example, as a power source of an input/output (I/O) unit in the FPGA 30. The power supply line L2 is also connected to a power supply input terminal P4 of an integrated circuit (IC) 31. That is, the FPGA 30 and the IC 31 share the secondary power source 22. The IC 31 has, for example, a form in which a semiconductor chip is contained in a package.

The power supply line L3 to which power is supplied from the secondary power source 23 is connected to a power supply input terminal P3 of the FPGA 30. A voltage input through the power supply line L3 to the power supply input terminal P3 is used, for example, as a power source of an I/O unit in the FPGA 30. The power supply line L3 is also connected to a power supply input terminal P5 of an IC 32. That is, the FPGA 30 and the IC 32 share the secondary power source 23. The IC 32 has, for example, a form in which a semiconductor chip is contained in a package.

The power supply management device 10 is constructed including the sequence controller 14 and voltage shut-off circuits 12a and 12b. The sequence controller 14 controls the entire order in which the secondary power sources 21, 22, and 23 are turned on. The sequence controller 14 includes a voltage monitoring input terminal M1 connected to the power supply line L1 and a voltage monitoring input terminal M2 connected to the power supply line L2. The sequence controller 14 also includes a signal output terminal T1 connected to the enable input terminal EN2 of the secondary power source 22 and a signal output terminal T2 connected to the enable input terminal E3 of the secondary power source 23.

The sequence controller 14 is provided with a computer including a central processing unit (CPU) not illustrated, a memory, and the like. When the CPU executes a sequence control program stored in the memory, the sequence controller 14 controls the order in which the secondary power sources 21, 22, and 23 are turned on.

Figure 2:
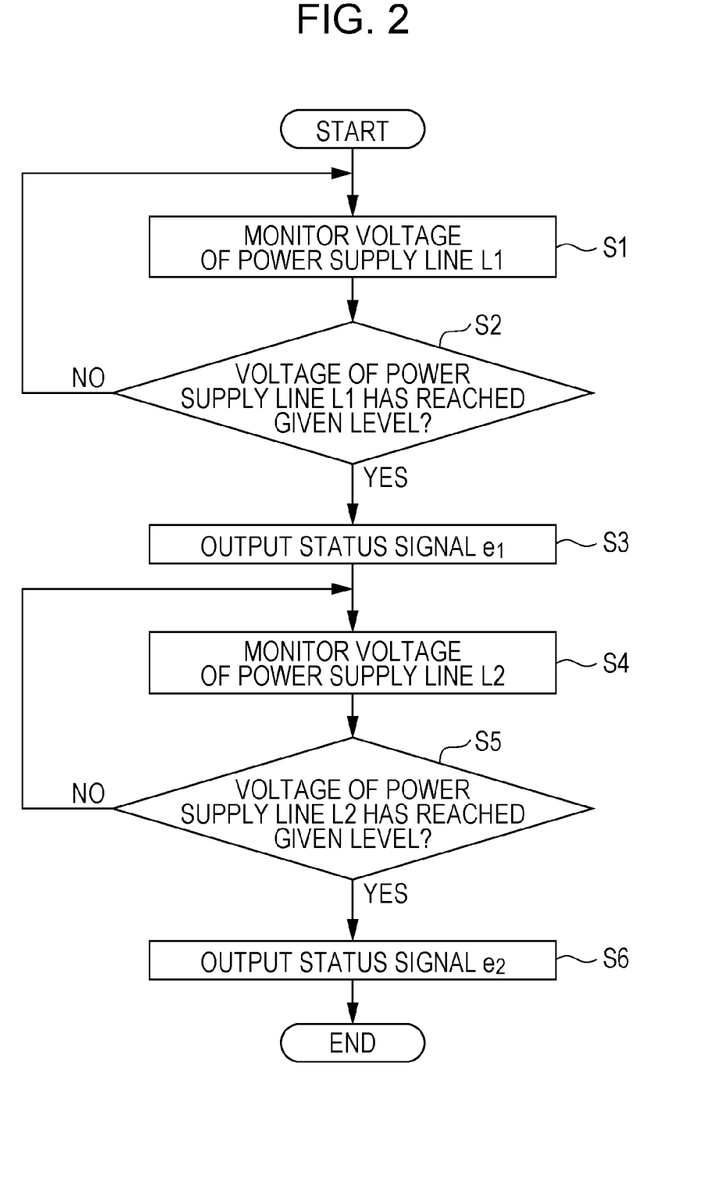
FIG. 2 is a flowchart illustrating a flow of a process in a sequence controller according to the embodiment of techniques of this disclosure.

FIG. 2 is a flowchart illustrating an example of a process based on the above-mentioned sequence control program executed by the sequence controller 14. The sequence controller 14 starts executing the sequence control program in response to the primary power source 20 being turned on, for example.

In step S1, the sequence controller 14 monitors a voltage of the power supply line L1 input from the input terminal M1.

In step S2, the sequence controller 14 determines whether or not the voltage of the power supply line L1 has reached a given level (for example, 1.5 V). The sequence controller 14, when determining that the voltage of the power supply line L1 has not reached the given level, returns the process to step S1 and, when determining that the voltage has reached the given level, causes the process to proceed to step S3.

In step S3, the sequence controller 14 outputs, from the signal output terminal T1, a high-level status signal $e_1$ indicating that the voltage of the power supply line L1 has reached the given level. Once the high-level status signal $e_1$ is input to the enable input terminal EN2 of the secondary power source 22, the secondary power source 22 is turned on.

In step S4, the sequence controller 14 monitors a voltage of the power supply line L2 input from the input terminal M2.

In step S5, the sequence controller 14 determines whether or not the voltage of the power supply line L2 has reached a given level (for example, 2.5 V). The sequence controller 14, when determining that the voltage of the power supply line L2 has not reached the given level, returns the process to step S4 and, when determining that the voltage has reached the given level, causes the process to proceed to step S6.

In step S6, the sequence controller 14 outputs, from the signal output terminal T2, the status signal $e_2$ indicating that the voltage of the power supply line L2 has reached the given level. Once the high-level status signal $e_2$ is input to the enable input terminal EN3 of the secondary power source 23, the secondary power source 23 is turned on.

As described above, through the above control performed by the sequence controller 14, after the turning on of the secondary power source 21, the secondary power source 22 is turned on and, after the turning on of the secondary power source 22, the secondary power source 23 is turned on. Note that the secondary power source 21, which is the first to be turned on, may be turned on in accordance with a signal output from the sequence controller 14, as in the secondary power sources 22 and 23, which are turned on second or later.

The voltage shut-off circuit 12a includes transistors Q1a and Q2a, resistive elements R1a, R2a, and R3a, and a capacitor Ca. N-channel metal-oxide-semiconductor field-effect transistors (MOSFETs), for example, may be used as the transistors Q1a and Q2a. The gate of the transistor Q2a is connected to the signal output terminal T1 of the sequence controller 14. The source of the transistor Q2a is connected to the ground line, and the drain thereof is connected to respective one ends of the resistive elements R3a and R2a and the capacitor Ca and is connected to the gate of the transistor Q1a. The other end of the resistive element R3a is connected to the power supply line L0. The other ends of the resistive element R2a and the capacitor Ca are connected to the ground line. The drain of the transistor Q1a is connected to the power supply line L2 and the source thereof is connected through the resistive element R1a to the ground line. Note that the transistors Q1a and Q2a may be bipolar transistors.

The circuit configuration of the voltage shut-off circuit 12b is the same as that of the voltage shut-off circuit 12a, and detailed description thereof is omitted. The drain of the transistor Q1b of the voltage shut-off circuit 12b is connected to the power supply line L3, and the gate of the transistor Q2b is connected to the signal output terminal T2 of the sequence controller 14.

Once the primary power source 20 is turned on, in the power shut-off circuit 12a, the voltage of the power supply line L0 is divided in accordance with the resistance ratio of the resistive elements R3a and R2a and, as a result, the gate of the transistor Q1a is biased. Thus, the transistor Q1a enters the on-state. The transistor Q1a entering the on-state causes the power supply line L2 to be short-circuited to the ground line. Similarly, in the power shut-off circuit 12b, the turning on of the primary power source 20 leads to the on-state of the transistor Q1b, thus causing the power supply line L3 to be short-circuited to the ground line. In this way, in response to the turning on of the primary power source 20, the transistors Q1a and Q1b enter the on-states, and thus the power supply lines L2 and L3 are short-circuited to the ground line at or before the start of voltage supply to the power supply line L1 from the secondary power source 21.

Then, once the voltage of the power supply line L1 reaches a given level (for example, 1.5 V) and becomes stable, a high-level status signal $e_1$ indicating that the voltage of the power supply line L1 has reached the given level is output from the signal output terminal T1 of the sequence controller 14. Thus, the transistor Q2a enters the on-state and the transistor Q1a enters the off-state and, as a result, the power supply line L2 is released from being short-circuited. In this way, with the turning on of the primary power source 20, the voltage shut-off circuit 12a short-circuits the power supply line L2 to the ground line and, in accordance with the status signal $e_1$, releases the power supply line L2 from being short-circuited. That is, with the turning on of the secondary power source 22, the voltage shut-off circuit 12a releases the power supply line L2 from being short-circuited.

Then, once the voltage of the power supply line L2 reaches a given level (for example, 2.5 V) and becomes stable, a high-level status signal $e_2$ indicating that the voltage of the power supply line L2 has reached the given level is output from the signal output terminal T2 of the sequence controller 14. Thus, the transistor Q2b enters the on-state and the transistor Q1b enters the off-state and, as a result, the power supply line L3 is released from being short-circuited. In this way, with the turning on of the primary power source 20, the voltage shut-off circuit 12b short-circuits the power supply line L3 to the ground line and, in accordance with the status signal $e_2$, releases the power supply line L3 from being short-circuited. That is, with the turning on of the secondary power source 23, the voltage shut-off circuit 12b releases the power supply line L3 from being short-circuited.

In the voltage shut-off circuit 12a, the capacitor Ca is used in order to adjust the off-timing of the transistor Q1a for the status signal $e_1$. That is, the larger the capacitance of the capacitor Ca, the longer the off-timing of the transistor Q1a for the status signal $e_1$ may be delayed. Adjusting the capacitance of the capacitor Ca in accordance with the turn-on time (turn-on characteristics) of the secondary power source 22 and the variations in switching characteristics of the transistors Q1a and Q2a enables the release timing of the power supply line L2 to be optimized. Additionally, in the voltage shut-off circuit 12a, connecting the resistive element R1a in series with the transistor Q1a makes it possible to impose a limitation on a leakage current $i_L$ flowing from the power supply input terminal P2 of the FPGA 30 during short circuit of the power supply line L2. Thus, an overcurrent may be inhibited from flowing into the FPGA 30 during short circuit of the power supply line L2.

Similarly, in the voltage shut-off circuit 12b, the capacitor Cb is used in order to adjust the off-timing of the transistor Q1b for the status signal $e_2$. Adjusting the capacitance of the capacitor Cb in accordance with the turn-on time (turn-on characteristics) of the secondary power source 23 and the variations in switching characteristics of the transistors Q1b and Q2b enables the release timing of the power supply line L3 to be optimized. Additionally, in the voltage shut-off circuit 12b, connecting the resistive element R1b in series with the transistor Q1b makes it possible to impose a limitation on a leakage current $i_L$ flowing from the power supply input terminal P3 of the FPGA 30 during short circuit of the power supply line L3. Thus, an overcurrent may be inhibited from flowing into the FPGA 30 during short circuit of the power supply line L3.

Note that the power supply management device 10 is an example of a power supply management device in the techniques of this disclosure. The power supply lines L1, L2, and L3 are an example of a plurality of power supply lines in the techniques of this disclosure. The sequence controller 14 is an example of a signal output unit in the techniques of this disclosure. The voltage shut-off circuits 12a and 12b are examples of a voltage shut-off circuit in the techniques of this disclosure. The transistors Q1a and Q1b are examples of a switching element in the techniques of this disclosure. The capacitors Ca and Cb are examples of an adjustment circuit in the techniques of this disclosure. The resistive elements R1a and R1b are examples of a resistive element in the techniques of this disclosure. The electronic apparatus 100 is an example of an electronic apparatus in the techniques of this disclosure. The secondary power sources 21, 22, and 23 are an example of a plurality of power sources in the techniques of this disclosure.

Figure 3:
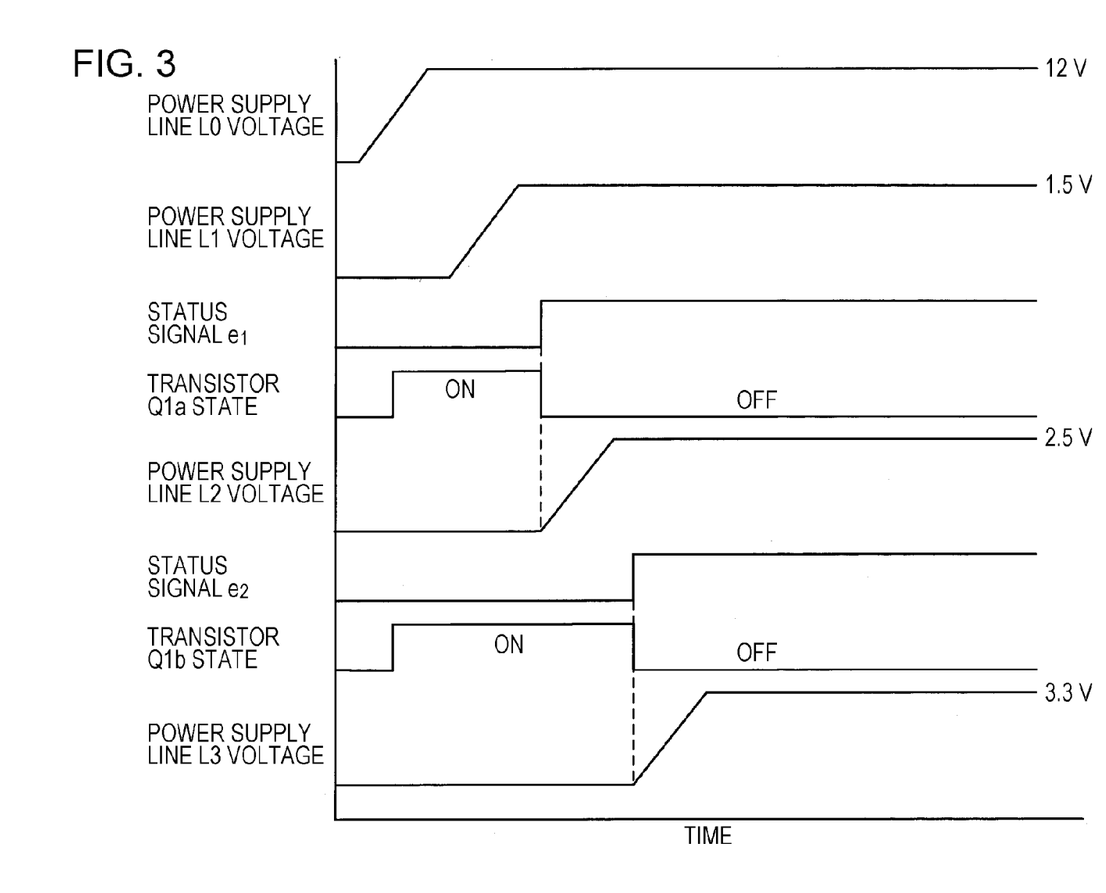
FIG. 3 is a time chart which illustrating operations at the time of turning on of power sources of the electronic apparatus according to the embodiment of techniques of this disclosure.

FIG. 3 is a time chart illustrating operations at the time the power sources of the electronic apparatus 100 are turned on. In the electronic apparatus 100, once the primary power source 20 is turned on and the voltage of the power supply line L0 reaches a given level (for example, 12 V), the secondary power source 21 is turned on. Additionally, with the turning on of the primary power source 20, the transistors Q1a and Q1b of the voltage shut-off circuits 12a and 12b enter the on-states. Thus, the power supply lines L2 and L3 are short-circuited to the ground line. That is, the voltage shut-off circuits 12a and 12b short-circuit the power supply lines L2 and L3 to the ground line, respectively, at or before the start of voltage supply to the power supply line L1.

A voltage output from the secondary power source 21 is input through the power supply line L1 to the power supply input terminal P1 of the FPGA 30, and reaches through the inside of the FPGA 30 and into the power supply input terminals P2 and P3. However, since the transistors Q1a and Q1b of the voltage shut-off circuits 12a and 12b are in the on-states, the voltages of the power supply lines L2 and L3 are maintained at the ground level. A leakage current $i_L$ flowing from the power supply input terminal P1 of the FPGA 30, passing through the inside of the FPGA 30, and flowing out from the power supply input terminals P2 and P3 is discharged through the transistors Q1a and Q1b to the ground line.

Then, once the voltage of the power supply line L1 reaches a given level (for example, 1.5 V) and becomes stable, the sequence controller 14 outputs a high-level status signal $e_1$ from the signal output terminal T1. The high-level status signal $e_1$ is input to the enable input terminal EN2 of the secondary power source 22 and is input to the gate of the transistor Q2a of the voltage shut-off circuit 12a. Thus, along with the turning on of the secondary power source 22, the transistor Q1a of the voltage shut-off circuit 12a enters the off-state and the power supply line L2 is released from being short-circuited. Releasing the power supply line L2 from the short-circuited state along with the turning on of the secondary power source 22 in this way makes it possible to appropriately perform voltage supply to the power supply input terminal P2 of the FPGA 30.

Then, once the voltage of the power supply line L2 reaches a given level (for example, 2.5 V) and becomes stable, the sequence controller 14 outputs the high-level status signal $e_2$ from the signal output terminal T2. The high-level status signal $e_2$ is input to the enable input terminal EN3 of the secondary power source 23 and is input to the gate of the transistor Q2b of the voltage shut-off circuit 12b. Thus, along with the turning on of the secondary power source 23, the transistor Q1b of the voltage shut-off circuit 12b enters the off-state and the power supply line L3 is released from being short-circuited. Releasing the power supply line L3 from the short-circuited state along with the turning on of the secondary power source 23 in this way makes it possible to appropriately perform voltage supply to the power supply input terminal P3 of the FPGA 30.

As described above, the voltage shut-off circuit 12a short-circuits the power supply line L2 to the ground line at or before the start of voltage supply to the power supply line L1. In other words, the voltage shut-off circuit 12a short-circuits the power supply line L2 to the ground line at or before the turning on of the secondary power source 21, which is turned on first. Thus, even if a voltage supplied from the secondary power source 21 turned on first reaches through the inside of the FPGA 30, the voltage of the power supply line L2 is maintained at the ground level. Thus, the IC 31 connected to the power supply line L2 may be inhibited from being activated before the secondary power source 22 is turned on. Additionally, since the voltage shut-off circuit 12a releases the power supply line L2 from the short-circuited state in accordance with the turn-on timing of the secondary power source 22, there is no case where voltage supply to the power supply input terminal P2 of the FPGA 30 is inhibited.

Similarly, the voltage shut-off circuit 12b short-circuits the power supply line L3 to the ground line at or before the start of voltage supply to the power supply line L1. In other words, the voltage shut-off circuit 12b short-circuits the power supply line L3 to the ground line at or before the turning on of the secondary power source 21, which is turned on first. Thus, even if a voltage supplied from the secondary power source 21 turned on first reaches through the inside of the FPGA 30, the voltage of the power supply line L3 is maintained at the ground level. Thus, the IC 32 connected to the power supply line L3 may be inhibited from being activated before the secondary power source 23 is turned on. Additionally, since the voltage shut-off circuit 12b releases the power supply line L3 from the short-circuited state in accordance with the turn-on timing of the secondary power source 23, there is no case in which voltage supply to the power supply input terminal P3 of the FPGA 30 is inhibited.

Figure 4:
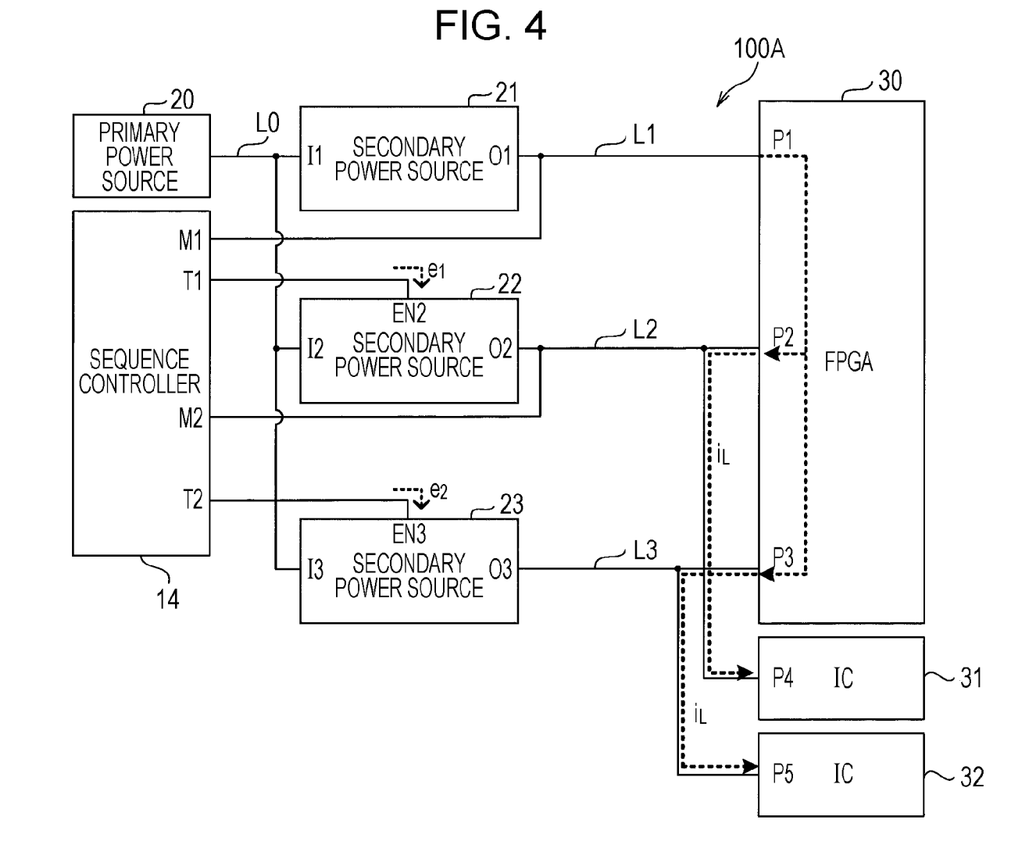
FIG. 4 is a block diagram illustrating a configuration of an electronic apparatus according to a comparative example.

FIG. 4 is a block diagram illustrating a configuration of an electronic apparatus 100A according to a comparative example. In FIG. 4, components the same as or equivalent to those of the electronic apparatus 100 according to the techniques of this disclosure illustrated in FIG. 1 are given the same reference characters and redundant detailed description thereof is omitted. The electronic apparatus 100A according to the comparative example differs from the electronic apparatus 100 according to the techniques of this disclosure in that the electronic apparatus 100A does not have the voltage shut-off circuits 12a and 12b.

Figure 5:
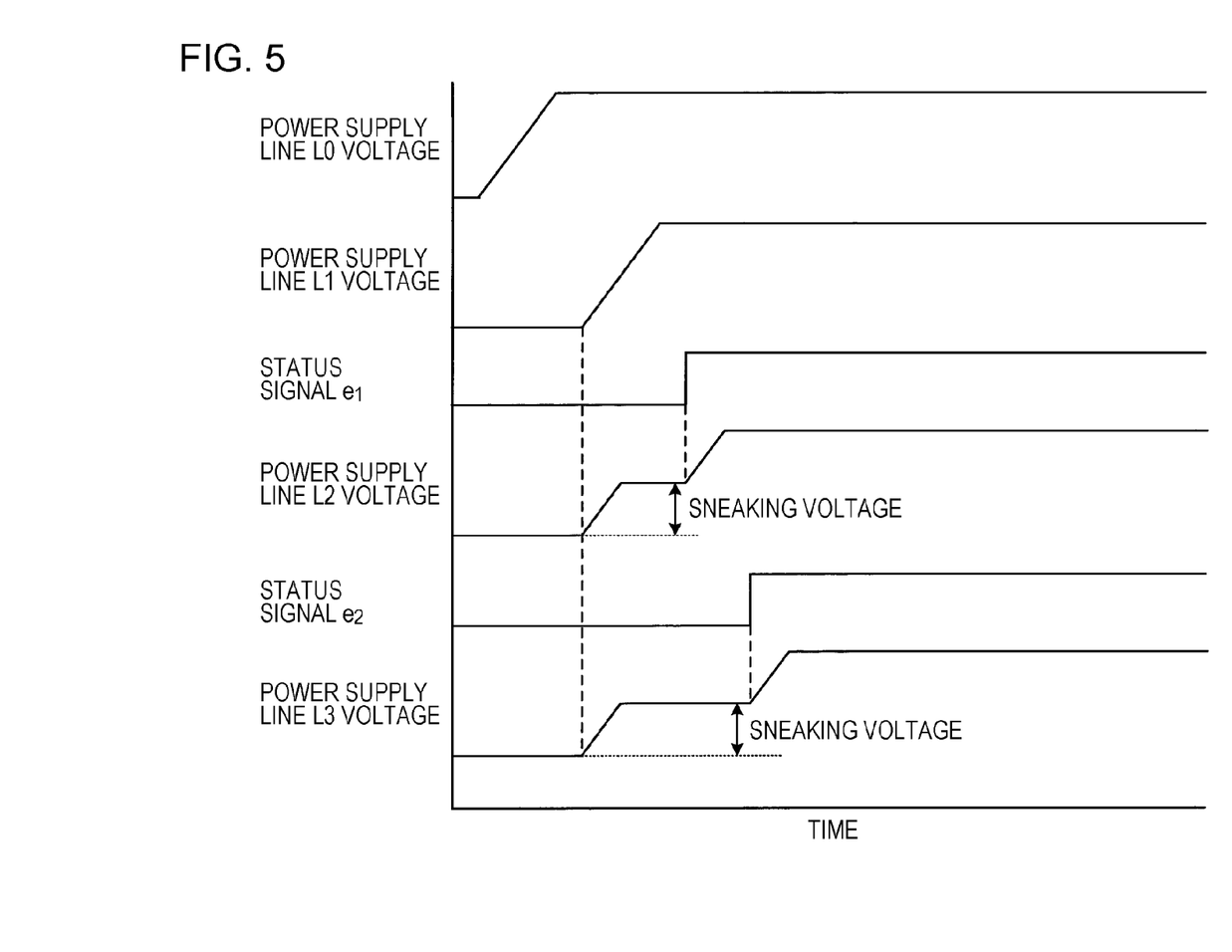
FIG. 5 is a time chart illustrating operations at the time of turning on of power sources of the electronic apparatus according to the comparative example.

FIG. 5 is a time chart illustrating operations at the time of turning on of power sources of the electronic apparatus 100A according to the comparative example. In the electronic apparatus 100A according to the comparative example, once the primary power source 20 is turned on and the voltage of the power supply line L0 reaches a given level (for example, 12 V), the secondary power source 21 is turned on. A voltage output from the secondary power source 21 is input through the power supply line L1 to the power supply input terminal P1 of the FPGA 30, and reaches through the inside of the FPGA 30 and into the power supply input terminals P2 and P3. As a result, a voltage at a level higher than the ground level appears in the power supply line L2 before a high-level status signal $e_1$ is output from the sequence controller 14 (that is, before the secondary power source 22 is turned on). Similarly, a voltage at a level higher than the ground level appears in the power supply line L3 before a high-level status signal $e_2$ is output from the sequence controller 14 (that is, before the secondary power source 23 is turned on).

Then, once the voltage of the power supply line L1 reaches a given level (for example, 1.5 V) and becomes stable, the sequence controller 14 outputs a high-level status signal $e_1$ from the signal output terminal T1. Thus, the secondary power source 22 is turned on.

After the turning on of the secondary power source 22, once the voltage of the power supply line L2 reaches a given level (for example, 2.5 V) and becomes stable, the sequence controller 14 outputs a high-level status signal $e_2$ from the signal output terminal T2. Thus, the secondary power source 23 is turned on.

As described above, in the electronic apparatus 100A according to the comparative example, because of a voltage reaching into the FPGA 30, a voltage at a level higher than the ground level appears in the power supply line L2 before the turning on of the secondary power source 22. Thus, there is a possibility that, before the secondary power source 22 is turned on, a power source voltage will be supplied to the power supply input terminal P4 of the IC 31 to activate the IC 31. Activating the IC 31 at an unintended timing is likely to cause a malfunction to occur in the electronic apparatus 100A. Additionally, in the electronic apparatus 100A according to the comparative example, because of a voltage reaching into the FPGA 30, a voltage at a level higher than the ground level appears in the power supply line L3 before the secondary power source 23 is turned on. Thus, there is a possibility that, before the turning on of the secondary power source 23, a power source voltage will be supplied to the power supply input terminal P5 of the IC 32 to activate the IC 32. Activating the IC 32 at an unintended timing is likely to cause a malfunction to occur in the electronic apparatus 100A.

On the other hand, in the electronic apparatus 100 according to the techniques of this disclosure, the power supply management device 10 causes the power supply lines L2 and L3 to be short-circuited to the ground line at least from the time at which voltage supply to the power supply line L1 is started. Thus, voltage variations of the power supply line L2 before the turning on of the secondary power source 22 and voltage variations of the power supply line L3 before the turning on of the secondary power source 23 may be inhibited. Thus, activation of the IC 31 before the turning on of the secondary power source 22 and activation of the IC 32 before the turning on of the secondary power source 23 may be inhibited, and the occurrence of a malfunction in the electronic apparatus 100 may be inhibited.

Additionally, since the power supply management device 10 releases the power supply line L2 from the short-circuited state along with the turning on of the secondary power source 22 and releases the power supply line L3 from the short-circuited state along with the turning on of the secondary power source 23, there is no case in which voltage supply to the power supply input terminals P2 and P3 of the FPGA 30 is inhibited.

In this way, with the power supply management device 10 according to the techniques of this disclosure, it is possible to shut off a voltage that is input from one voltage supply line to another among a plurality of power supply lines to which voltages are supplied in a predetermined order, without inhibiting voltage supply to each power supply line.

Additionally, since the power supply management device 10 may be implemented by connecting a voltage shut-off circuit to a power supply line where voltage re-direction is likely to occur, the power supply management device 10 may be applied regardless of a power supply configuration and is versatile.

Additionally, since the power supply management device 10 controls the timing for releasing a power supply line from the short-circuited state using a status signal for controlling the order in which secondary power sources are turned on, the power supply management device 10 is easily applicable to existing power supply configurations, and thus may solve a problem due to voltage re-direction at a low cost.

Additionally, since the voltage shut-off circuits 12a and 12b are configured to short-circuit power supply lines with the transistors Q1a and Q1b serving as switching elements, a re-directed voltage may be shut off regardless of how large the voltage and current generated in the power supply lines are.

Additionally, since the voltage shut-off circuits 12a and 12b may be implemented with relatively small-sized circuit configurations, the arrangement space for the voltage shut-off circuits 12a and 12b in an electronic apparatus may be reduced. Additionally, since the voltage shut-off circuits 12a and 12b have the same configuration, it is easy to add a voltage shut-off circuit in accordance with a power supply configuration.

Additionally, in the voltage shut-off circuits 12a and 12b, adjusting the capacitances of the capacitors Ca and Cb enables the release timings of power supply lines to be optimized.

Additionally, in the voltage shut-off circuits 12a and 12b, connecting the resistive elements R1a and R1b in series with the transistors Q1a and Q1b, respectively, makes it possible to impose a limitation on the leakage current $i_L$ flowing from the power supply input terminals P2 and P3 of the FPGA 30 during the short circuit of power supply lines. Thus, an overcurrent may be inhibited from flowing into the FPGA 30 during short circuit.

Second Embodiment

Figure 6:
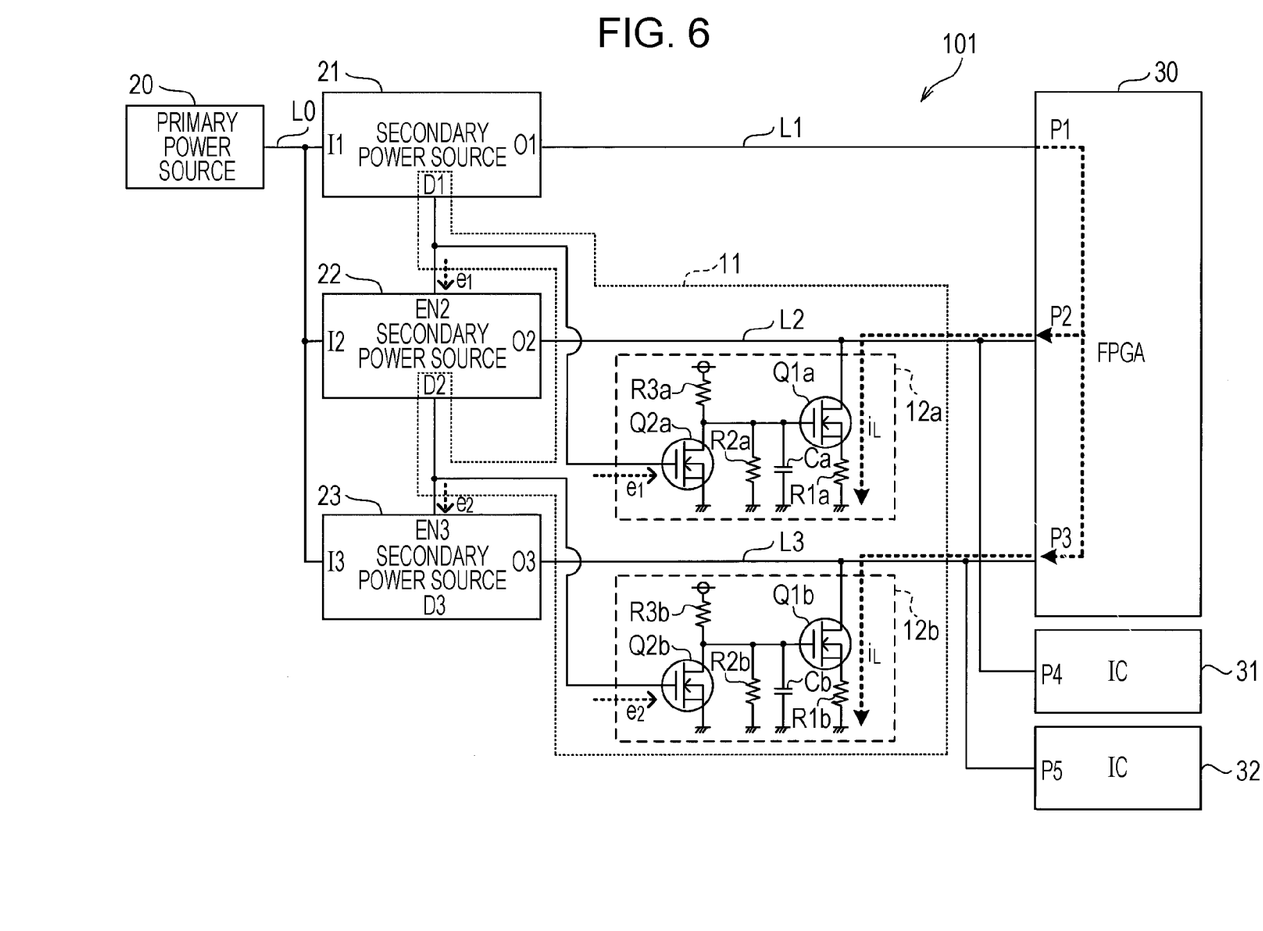
FIG. 6 is a block diagram illustrating a configuration of an electronic apparatus including a power supply management device according to an embodiment of techniques of this disclosure.

FIG. 6 is a block diagram illustrating a configuration of an electronic apparatus 101 including a power supply management device 11 according to a second embodiment of the techniques of this disclosure. In FIG. 6, components the same as or equivalent to those of the electronic apparatus 100 according to the first embodiment illustrated in FIG. 1 are given the same reference characters and redundant detailed description thereof is omitted. In the electronic apparatus 101 according to the second embodiment, the functions of the sequence controller 14 are shouldered by the secondary power sources 21, 22, and 23.

The secondary power source 21 converts an output voltage of the primary power source 20 supplied to the input terminal I1 to a voltage of, for example, 1.5 V and outputs the 1.5 V voltage from the output terminal O1. The secondary power source 21 includes, in addition to the input terminal I1 and the output terminal O1, a signal output terminal D1. The signal output terminal D1 is connected to the input terminal EN2 of the secondary power source 22 and the gate of the transistor Q2a of the voltage shut-off circuit 12a. The secondary power source 21 has a function of monitoring a voltage (that is, the voltage of the power source line L1) output to the output terminal O1 thereof. When the voltage output to the output terminal O1 has reached a given level (for example, 1.5 V), the secondary power source 21 outputs a high-level status signal $e_1$ from the signal output terminal D1 and supplies the status signal $e_1$ to the secondary power source 22 and the voltage shut-off circuit 12a.

The secondary power source 22 is turned on in accordance with the status signal $e_1$ from the secondary power source 21 supplied to the enable input terminal EN2, and converts an output voltage of the primary power source 20 supplied to the input terminal I2 to a voltage of, for example, 2.5 V and outputs the 2.5 V voltage from the output terminal O2. The secondary power source 22 includes, in addition to the input terminal I2 and the output terminal O2, a signal output terminal D2. The signal output terminal D2 is connected to the input terminal EN3 of the secondary power source 23 and the gate of the transistor Q2b of the voltage shut-off circuit 12b. The secondary power source 22 has a function of monitoring a voltage (that is, the voltage of the power source line L2) output to the output terminal O2 thereof. When the voltage output to the output terminal O2 has reached a given level (for example, 2.5 V), the secondary power source 22 outputs a high-level status signal $e_2$ from the signal output terminal D2 and supplies the status signal $e_2$ to the secondary power source 23 and the voltage shut-off circuit 12b.

The secondary power source 23 is turned on in accordance with the status signal $e_2$ from the secondary power source 22 supplied to the enable input terminal EN3, and converts an output voltage of the primary power source 20 supplied to the input terminal I3 to a voltage of, for example, 3.3 V and outputs the 3.3 V voltage from the output terminal O3. The secondary power source 23 includes, in addition to the input terminal I3 and the output terminal O3, a signal output terminal D3. The secondary power source 23 has a function of monitoring a voltage (that is, the voltage of the power source line L2) output to the output terminal O3 thereof. When the voltage output to the output terminal O3 has reached a given level (for example, 3.3 V), the secondary power source 23 outputs a high-level status signal $e_3$ from the signal output terminal D3. Note that, in the electronic apparatus 101 according to this embodiment, there is no secondary power source that is turned on after the secondary power source 23 is turned on, and thus the status signal $e_3$ will not be used.

In the electronic apparatus 101 according to the second embodiment, the power supply management device 11 is configured including functional portions that output status signals $e_1$ and $e_2$ in the secondary power sources 21 and 22, and the voltage shut-off circuits 12a and 12b. The secondary power sources 21 and 22 in the second embodiment have a function serving as the signal output unit of the techniques of this disclosure.

The operations at the time of the turning on of power sources of the electronic apparatus 101 according to the second embodiment are pursuant to the operations of the electronic apparatus 100 according to the first embodiment indicated by the time chart illustrated in FIG. 3. That is, the operations are similar to those of the electronic apparatus 100 according to the first embodiment, except that the secondary power source 21 outputs a status signal $e_1$ and the secondary power source 22 outputs a status signal $e_2$.

In the electronic apparatus 101, once the primary power source 20 is turned on and the voltage of the power supply line L0 reaches a given level (for example, 12 V), the secondary power source 21 is turned on. Additionally, with the turning on of the primary power source 20, the transistors Q1a and Q1b of the voltage shut-off circuits 12a and 12b enter the on-states. Thus, the power supply lines L2 and L3 are short-circuited to the ground line. That is, the voltage shut-off circuits 12a and 12b short-circuit the power supply lines L2 and L3 to the ground line, respectively, at or before the start of voltage supply to the power supply line L1.

A voltage output from the secondary power source 21 is input through the power supply line L1 to the power supply input terminal P1 of the FPGA 30, and reaches through the inside of the FPGA 30 and into the power supply input terminals P2 and P3. However, since the transistors Q1a and Q1b of the voltage shut-off circuits 12a and 12b are in the on-states, the voltages of the power supply lines L2 and L3 are maintained at the ground level. A leakage current $i_L$ flowing from the power supply input terminal P1 of the FPGA 30, passing through the inside of the FPGA 30, and flowing out from the power supply input terminals P2 and P3 is discharged through the transistors Q1a and Q1b to the ground line.

Then, once the voltage of the power supply line L1 reaches a given level (for example, 1.5 V) and becomes stable, the secondary power source 21 outputs a high-level status signal $e_1$ from the signal output terminal D1. The high-level status signal $e_1$ is input to the enable input terminal EN2 of the secondary power source 22 and is input to the gate of the transistor Q2a of the voltage shut-off circuit 12a. Thus, along with the turning on of the secondary power source 22, the transistor Q1a of the voltage shut-off circuit 12a enters the off-state and the power supply line L2 is released from being short-circuited. Releasing the power supply line L2 from the short-circuited state along with the turning on of the secondary power source 22 in this way makes it possible to appropriately perform voltage supply to the power supply input terminal P2 of the FPGA 30.

Then, once the voltage of the power supply line L2 reaches a given level (for example, 2.5 V) and becomes stable, the secondary power source 22 outputs a high-level status signal $e_2$ from the signal output terminal D2. The high-level status signal $e_2$ is input to the enable input terminal EN3 of the secondary power source 23 and is input to the gate of the transistor Q2b of the voltage shut-off circuit 12b. Thus, along with the turning on of the secondary power source 23, the transistor Q1b of the voltage shut-off circuit 12b enters the off-state and the power supply line L3 is released from being short-circuited. Releasing the power supply line L3 from the short-circuited state along with the turning on of the secondary power source 23 in this way makes it possible to appropriately perform voltage supply to the power supply input terminal P3 of the FPGA 30.

With the power supply management device 11 and the electronic apparatus 101 according to the second embodiment, as in the first embodiment, it is possible to shut off a voltage that is input from one voltage supply line to another among a plurality of power supply lines to which voltages are supplied in a predetermined order, without inhibiting voltage supply to each power supply line.

Additionally, in the electronic apparatus 101 according to the second embodiment, each secondary power source has a function of outputting a status signal when the output voltage of the secondary power source has reached a given level. Thus, the sequence controller 14 according to the first embodiment that controls the entire order in which a plurality of secondary power sources are turned on may be removed.

Note that, for the power supply management devices 10 and 11 and the electronic apparatuses 100 and 101 according to the first and second embodiments described above, various changes and modifications may be made.

For example, in each of the embodiments described above, a configuration including three secondary power sources is provided; however, the number of secondary power sources may be increased or decreased suitably in accordance with a device configuration. In this case, a voltage shut-off circuit may be appropriately connected to each of power supply lines in which voltage re-direction is predicted to occur.

Additionally, in each of the embodiments described above, the voltage shut-off circuit is configured to short-circuit power supply lines to the ground level; however, the voltage shut-off circuit is not limited to this. The voltage shut-off circuit may short-circuit a power supply line to a line at a voltage level (for example, a negative voltage) at which the IC 31 and IC 32 are not activated.

Additionally, in each of the embodiments described above, the configuration is such that the voltage shut-off circuits 12a and 12b are connected to the power supply lines L2 and L3 for which voltage supply is started second or later, respectively; however, the configuration is not limited to this. For example, even in a power supply line where voltage re-direction occurs, it is not desired that a voltage shut-off circuit be provided for the power supply line in the case where another device is not connected to the power supply line and in the case where no malfunction occurs in another device to which the power supply line concerned is connected.

Additionally, in each of the embodiments described above, the electronic apparatus employing the distributed power system is exemplified; however, the techniques of this disclosure may be applied to any device having a plurality of power sources among which the order of the turning on is determined in advance.

Additionally, in each of the embodiments described above, the FPGA is exemplified as a multiple-power-source device; however, the multiple-power-source device is not limited to this. Other examples of the multiple-power-source device include an application specific integrated circuit (ASIC), a microcomputer, and a digital signal processor (DSP).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A power supply management device comprising:
    a signal output unit operative to output, for each of a plurality of power supply lines for which voltage supply is started in a predetermined order, a signal indicating that a voltage of the power supply line has reached a given level; and
    a voltage shut-off circuit operative to short-circuit at least one of the power supply lines for which voltage supply is started second or later, to a portion at a voltage level lower than a level of a voltage supplied to each of the power supply lines, at or before a time point of start of voltage supply to one of the power supply lines for which voltage supply is started first, and to release the at least one power supply line from being short-circuited in accordance with the signal indicating that a voltage of one of the power supply lines for which voltage supply is started immediately before voltage supply to the at least one power supply line is started has reached a given level.

2. The power supply management device according to claim 1, wherein the voltage shut-off circuit includes a switching element connected to the at least one power supply line, the switching element being brought into an on-state at or before the time point of start of voltage supply to the power supply line for which voltage supply is started first and being brought into an off-state in accordance with the signal indicating that a voltage of the power supply line for which voltage supply is started immediately before voltage supply to the at least one power supply line is started has reached a given level.

3. The power supply management device according to claim 2, wherein the voltage shut-off circuit further includes an adjustment circuit operative to adjust an off timing of the switching element for the signal.

4. The power supply management device according to claim 2, wherein the voltage shut-off circuit further includes a resistive element operative to impose a limitation on a current flowing through the switching element brought into the on-state.

5. The power supply management device according to claim 1, wherein the voltage shut-off circuit is operative to short-circuit the at least one power supply line to a ground line.

6. The power supply management device according to claim 1, wherein the signal output unit is operative to supply the signal to a power source that supplies a voltage to the at least one power supply line, and the voltage shut-off circuit.

7. An electronic apparatus comprising:
  a plurality of power sources provided so as to correspond to respective ones of a plurality of power supply lines and operative to start power supply to respective ones of the plurality of power supply lines in a predetermined order;
  a signal output unit operative to output, for each of the power supply lines, a signal indicating that a voltage of the power supply line has reached a given level;
  a multiple-power-source device connected to the power supply line; and
  a voltage shut-off circuit operative to short-circuit at least one of the power supply lines for which voltage supply is started second or later, to a portion at a voltage level lower than a level of a voltage supplied to the power supply line, at or before a time point of start of voltage supply to one of the power supply lines for which voltage supply is started first, and to release the at least one power supply line from being short-circuited in accordance with the signal indicating that a voltage of one of the power supply lines for which voltage supply is started immediately before voltage supply to the at least one power supply line is started has reached a given level.

8. The electronic apparatus according to claim 7, wherein each of the power sources is turned on in accordance with the signal indicating that a voltage of the power supply line for which voltage supply is started immediately before voltage supply to a power supply line corresponding to the power source is started has reached a given level.

9. The electronic apparatus according to claim 7, wherein the voltage shut-off circuit includes a switching element connected to the at least one power supply line, the switching element being brought into an on-state at or before a time point of start of voltage supply to a power supply line for which voltage supply is started first and being brought into an off-state in accordance with the signal indicating that a power supply line for which voltage supply is started immediately before voltage supply to the at least one power supply line is started has reached a given level.

10. The electronic apparatus according to claim 9, wherein the voltage shut-off circuit further includes an adjustment circuit operative to adjust an off timing of the switching element for the signal.

11. The electronic apparatus according to claim 9, wherein the voltage shut-off circuit further includes a resistive element operative to impose a limitation on a current flowing through the switching element brought into the on-state.

12. The electronic apparatus according to claim 9, further comprising a primary power source operative to output a voltage to be input to the plurality of power sources,
  wherein each of the plurality of power sources is operative to convert a voltage output from the primary power source to a given level and to output the voltage, and
  wherein the switching element enters the on-state in response to the primary power source being turned on.

13. The electronic apparatus according to claim 7, wherein the voltage shut-off circuit is operative to short-circuit the at least one power supply line to a ground line.

14. The electronic apparatus according to claim 7, wherein the signal output unit is provided separately from the plurality of power sources.

15. The electronic apparatus according to claim 7, wherein the signal output unit is provided integrally with each of the plurality of power sources.

16. The electronic apparatus according to claim 7, further comprising a semiconductor device connected to the at least one signal line.

17. A power supply management method comprising:
  short-circuiting at least one power supply line for which voltage supply is started second or later, among a plurality of power supply lines for which voltage supply is started in a predetermined order, to a portion at a voltage level lower than a level of a voltage supplied to each of the plurality of power supply limes, at or before a time point of start of supply of a voltage to one of the power supply lines for which voltage supply is started first; and
  when a voltage of one of the power supply lines for which voltage supply is started immediately before voltage supply to the at least one power supply line is started has reached a given level, releasing the at least one power supply line from being short-circuited to start voltage supply to the at least one power supply line.

18. The power supply management method according to claim 17, wherein the at least one power supply line is released from being short-circuited in accordance with a signal indicating that the power supply line for which voltage supply is started immediately before voltage supply to the at least one power supply line is started has reached a given level.

19. The power supply management method according to claim 17, wherein the at least one power supply line is short-circuited to a ground line at or before the time point of start of voltage supply to the power supply line for which voltage supply is started first.

* * * * *